United States Patent
Jain et al.

(10) Patent No.: US 8,938,434 B2
(45) Date of Patent: Jan. 20, 2015

(54) HOUSEHOLD GROUPING BASED ON PUBLIC RECORDS

(75) Inventors: Naveen K. Jain, Bellevue, WA (US); John K. Arnold, Des Moines, WA (US); Kevin R. Marcus, Woodinville, WA (US); Niraj Anil Shah, Mercer Island, WA (US)

(73) Assignee: Intelius, Inc., Bellevue, WA (US)

( * ) Notice: Subject to any disclaimer, the term of this patent is extended or adjusted under 35 U.S.C. 154(b) by 638 days.

(21) Appl. No.: 11/285,789

(22) Filed: Nov. 22, 2005

(65) Prior Publication Data

US 2006/0248048 A1  Nov. 2, 2006

Related U.S. Application Data

(60) Provisional application No. 60/630,126, filed on Nov. 22, 2004.

(51) Int. Cl.
*G06F 7/00* (2006.01)
*G06F 17/30* (2006.01)
*G06Q 30/00* (2012.01)

(52) U.S. Cl.
CPC .......... *G06Q 30/00* (2013.01); *G06F 17/30958* (2013.01)
USPC .......................................... 707/706

(58) Field of Classification Search
CPC ................. G06F 17/30958; G06F 17/30867
USPC ............................... 707/706, 999.101
See application file for complete search history.

(56) References Cited

U.S. PATENT DOCUMENTS

| | | | |
|---|---|---|---|
| 5,930,764 A * | 7/1999 | Melchione et al. | 705/10 |
| 6,678,685 B2 * | 1/2004 | McGill et al. | 725/34 |
| 6,912,540 B2 * | 6/2005 | Kohut et al. | 1/1 |
| 7,120,928 B2 * | 10/2006 | Sheth et al. | 726/4 |
| 7,739,246 B2 * | 6/2010 | Mooney et al. | 707/687 |
| 7,912,842 B1 * | 3/2011 | Bayliss | 707/749 |
| 2002/0194058 A1 * | 12/2002 | Eldering | 705/10 |
| 2002/0194226 A1 * | 12/2002 | Sheth et al. | 707/517 |

* cited by examiner

*Primary Examiner* — Aleksandr Kerzhner
(74) *Attorney, Agent, or Firm* — Merchant & Gould, P.C.

(57) ABSTRACT

Records are obtained from various sources, including public records, and are then augmented and grouped. At least one augment key is applied to each of the records resulting in an augment key value for each record. The records are augmented based on the key value. Augmenting the records includes combining the fields of the common records into a single record and then removing the duplicate records. The augmented records are then grouped according to household. At least one household grouping key is applied to each of the augmented records resulting in a household grouping key value for each record. The records having the same household grouping key value are displayed as a household grouping.

20 Claims, 8 Drawing Sheets

| | First Name | MI | Last Name | | | |
|---|---|---|---|---|---|---|
| | joe | | smith | | Search | |
| | City | State | Zip | | | |
| | Small City | WA | | | | |

| | Name | Approximate Age | Birth Date | Phone | Address |
|---|---|---|---|---|---|
| 1 | SMITH, TIA C<br>SMITH, LARY J<br>SMITH, JACK A<br>SMITH, JOE R<br>SMITH, CINDY L | | | | |
| 2 | SMITH, JOEL N | | | | |
| 3 | SMITH, JOE R<br>SMITH, SALLY | | | | |
| 4 | SMITH, JOE | | | | |

*Fig.8*

HOUSEHOLD GROUPING BASED ON PUBLIC RECORDS

RELATED APPLICATIONS

This utility patent application claims the benefit under 35 United States Code §119(e) of U.S. Provisional Patent Application No. 60/630,126 filed on Nov. 22, 2004, which is hereby incorporated by reference in its entirety.

BACKGROUND OF THE INVENTION

Many different search engines exist to locate and find out information about individuals. In order to find an individual, the searcher inputs information about the individual they are searching for into the search engine. For example, the searcher may input the person's last name, first name, address, phone number, email address, and the like to locate an individual. The search engine then performs a search and returns each individual entry.

BRIEF DESCRIPTION OF THE DRAWINGS

FIG. 8 shows an exemplary household grouping screen, in accordance with aspects of the invention.

DETAILED DESCRIPTION OF THE PREFERRED EMBODIMENT

Figure 1:
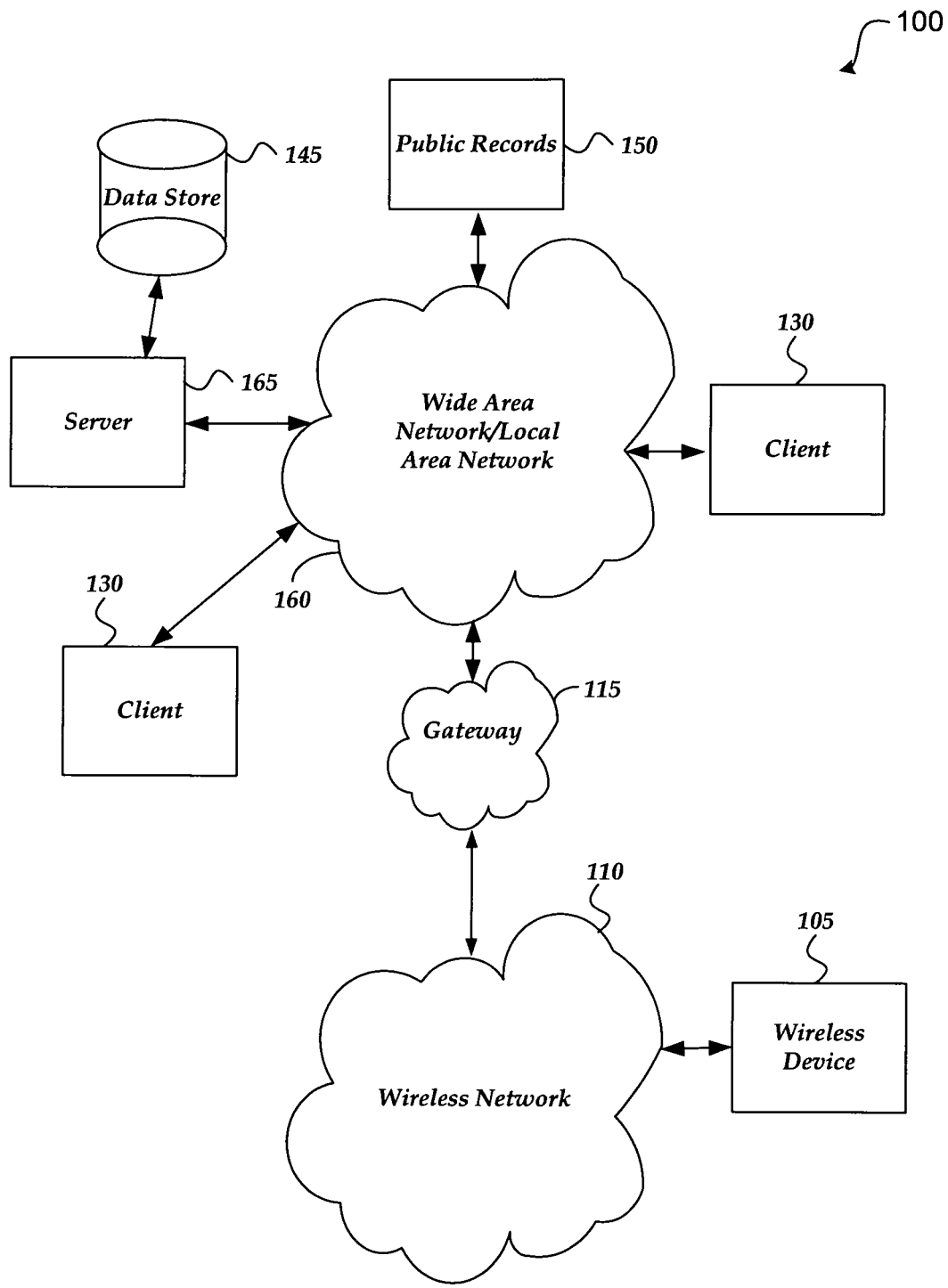
FIG. 1 illustrates a household grouping system.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.
Illustrative Operating Environment With reference to FIG. 1, an exemplary household grouping system 100 in which the invention operates includes one or more wireless devices 105, wireless network 110, gateway 115, wide area network (WAN)/local area network (LAN) 160, one or more client devices 130, one or more servers 165, data store 145, and public records 150.

Generally, household grouping system 100 augments records, groups households, and displays the grouped households. The records are obtained from various sources, including public records 150, and are then augmented and grouped according to household.

Server 165 couples to WAN/LAN 160 through communication mediums and is configured to augment and group the records. At least one augment key is applied to each of the obtained records resulting in an augment key value for each record. The records are augmented and sorted based on the augmented key value. According to one embodiment, augmenting the records involves creating a combined record for all of the records having the same augmented key value and then removing the duplicate records. According to one embodiment, the combined record is created by OR'ing together all of the records having the same augment key value. The augmented records are then stored in data store 145 for later use.

Server 165 is also configured to perform a household grouping operation on the augmented records. At least one household grouping key is applied to each of the augmented records resulting in an household grouping key value for each of the augmented records. The records having the same household grouping key value are then displayed to client 130 and/or wireless device 105 as a household grouping.

Wireless device 105 couples to wireless network 110 and includes any device capable of connecting to a wireless network such as wireless network 110. Such devices include cellular telephones, smart phones, pagers, radio frequency (RF) devices, infrared (IR) devices, citizen band radios (CBs), integrated devices combining one or more of the preceding devices, and the like. Wireless device 105 may also include other devices that have a wireless interface such as PDAs, handheld computers, personal computers, multiprocessor systems, microprocessor-based or programmable consumer electronics, network PCs, and the like.

Wireless network 110 transports information to and from devices capable of wireless communication, such as wireless device 105. Wireless network 110 may include both wireless and wired components. For example, wireless network 110 may include a cellular tower linked to a wired telephone network. Typically, the cellular tower carries communication to and from cell phones, pagers, and other wireless devices, and the wired telephone network carries communication to regular phones, long-distance communication links, and the like.

Wireless network 110 couples to WAN/LAN through gateway 115. Gateway 115 routes information between wireless network 110 and WAN/LAN 200. For example, wireless device 105 may access network 160 using gateway 115. Gateway 115 may translate requests for web pages from wireless devices to hypertext transfer protocol (HTTP) messages, which may then be sent to WAN/LAN 160. Gateway 115 may then translate responses to such messages into a form compatible with the requesting device. Gateway 115 may also transform other messages sent from wireless devices 105 into information suitable for WAN/LAN 1600, such as e-mail, audio, voice communication, and the like.

Typically, WAN/LAN 160 transmits information between computing devices. One example of a WAN is the Internet, which connects millions of computers over a host of gateways, routers, switches, hubs, and the like. An example of a LAN is a network used to connect computers in a single office. A WAN may connect multiple LANs.

Client 130 couples to WAN/LAN 160 and includes any device capable of connecting to a data network, and is configured to receive and display household grouping information.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Figure 2:
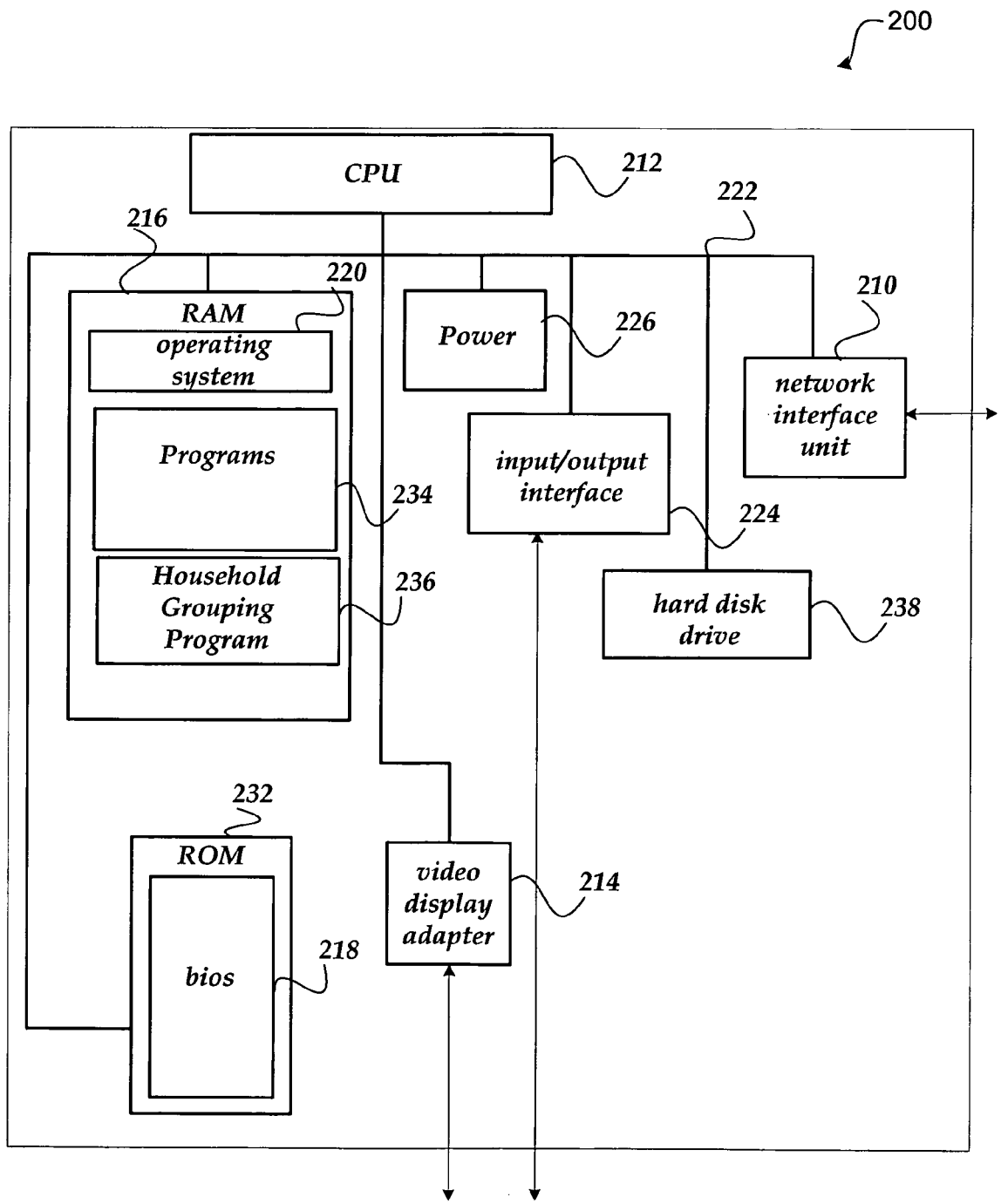
FIG. 2 shows an exemplary computing device.

FIG. 2 shows an exemplary computing device, in accordance with aspects of the invention. Computing device 200 may be configured as a server, a client, or a wireless device.

Device 200 may transmit and receive data relating to household groupings. When configured as a server, device 200 may transmit WWW pages to a WWW browser application program executing on requesting devices (wireless device 105 and client 130) to display the household groupings. For instance, server 165 displayed in FIG. 1 may transmit pages and forms for receiving search input and displaying household grouping data. The transactions may take place over the Internet, WAN/LAN 200, or some other communications network.

Computing device 200 may include many more components than those shown in FIG. 2. However, the components shown are sufficient to disclose an illustrative embodiment for practicing the present invention.

As shown in FIG. 2, computing device may connect to WAN/LAN 160, wireless network 110, or other communications network, via network interface unit 210. Network interface unit 210 may be wired or wireless, and includes the necessary circuitry for connecting computing device 200 to the desired network, and is constructed for use with various communication protocols including the TCP/IP protocol. Typically, network interface unit 210 is a card contained within computing device 200. Network interface unit 210 may include a radio layer (not shown) that is arranged to transmit and receive radio frequency communications. Network interface unit 210 connects computing device 200 to external devices, via a communications carrier or service provider.

Computing device 200 also includes central processing unit 212, video display adapter 214, and a mass memory, all connected via bus 222. The mass memory generally includes RAM 216, ROM 232, and one or more permanent mass storage devices, such as hard disk drive 238, a tape drive, CD-ROM/DVD-ROM drive, and/or some other drive. The mass memory stores operating system 220 for controlling the operation of computing device 200. This component may comprise a general purpose server operating system, such as UNIX, LINUX™, Microsoft WINDOWS XP®, and the like. Basic input/output system ("BIOS") 218 is also provided for controlling the low-level operation of computing device 200.

The mass memory also stores program code and data. More specifically, the mass memory stores applications including programs 234, and household grouping program 236. Generally, household grouping program 236 is used to augment records and perform household grouping. Programs 234 may include computer executable instructions which, when executed by computing device 200, generate WWW browser displays, including performing the logic described above.

Computing device 200 may also comprises input/output interface 224 for communicating with external devices, such as a mouse, keyboard, scanner, or other input devices not shown in FIG. 2. Hard disk drive 238 is utilized by computing device 200 to store, among other things, application programs, databases, and program data used by household grouping program 236. For example, augmented records, public records, customer records, and relational databases may be stored.

Power supply 226 provides power to computing device 200. According to one embodiment, a rechargeable battery provides power. The power may be also be provided by an external power source, such as an AC adapter or a powered docking cradle that supplements or recharges a battery.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Figure 3:
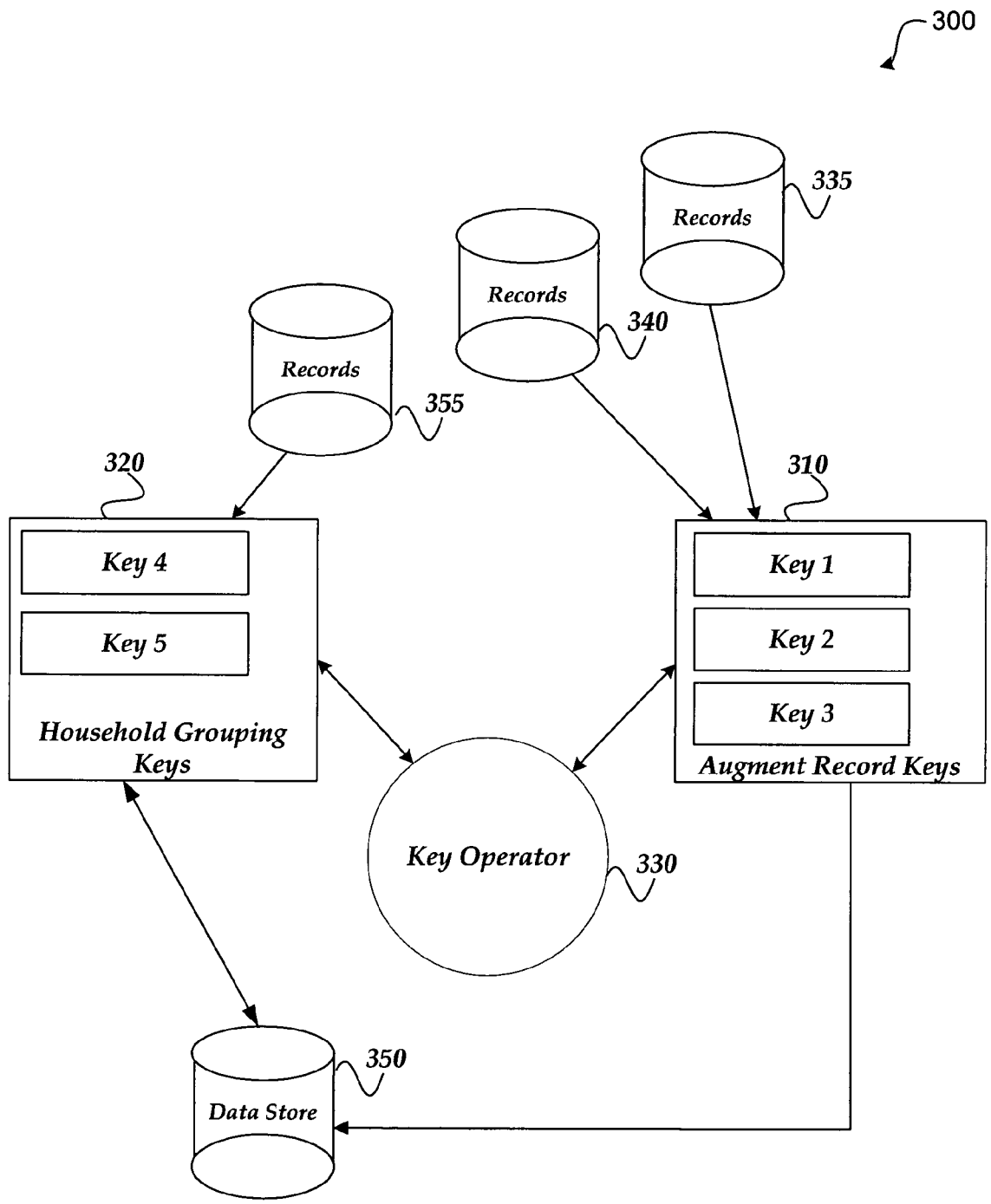
FIG. 3 illustrates a key system.

FIG. 3 illustrates a key system, in accordance with aspects of the invention. Generally, key system 300 applies one set of keys to records to augment the records and another set of keys to group the records into households.

Key operator 330 applies a set of augment record keys 310 to public records 335 and 340 resulting in an augment key value for each of the records. Any number of sources may be accessed to obtain the records. According to one embodiment, a set of three keys (Keys 1-3) is applied to the obtained records. Generally, the augment record keys include different fields from a record relating to an individual. Some of the fields used in the keys may include a zip code, last name, first name, street address, street unit, phone number, and date of birth (See FIG. 4 and related description).

Once each of the augment keys are applied and an augment key value is obtained, key operator 330 sorts the records based on the value of the key. The records having the same key value are then augmented. According to one embodiment, augmenting the records includes combining the fields from all of the records having the same key values and then removing the duplicate records. According to one embodiment, when records have conflicting values for a field, the most recent record field value is stored in the augmented record. The augmented records may be stored in data store 350 for later use.

A second set of keys, Keys 4 and 5 from household grouping keys 320, is applied by key operator 330 to the augmented records stored in data store 350 as well as any records obtained from an outside record source. Household grouping keys 320 are selected to group individuals into households. According to one embodiment, the keys include at least an address field (See FIG. 4). When records are obtained from a non-augmented source, such as records 355, key operator 330 applies augment record keys 310 to all of the records before applying household grouping keys 320. This helps to remove duplicate entries as well as create more complete records.

Once household grouping keys 320 have been applied by key operator 330, the resulting records are sorted based on the household grouping key values. The records having the same key value are grouped into households and displayed.

Figure 4:
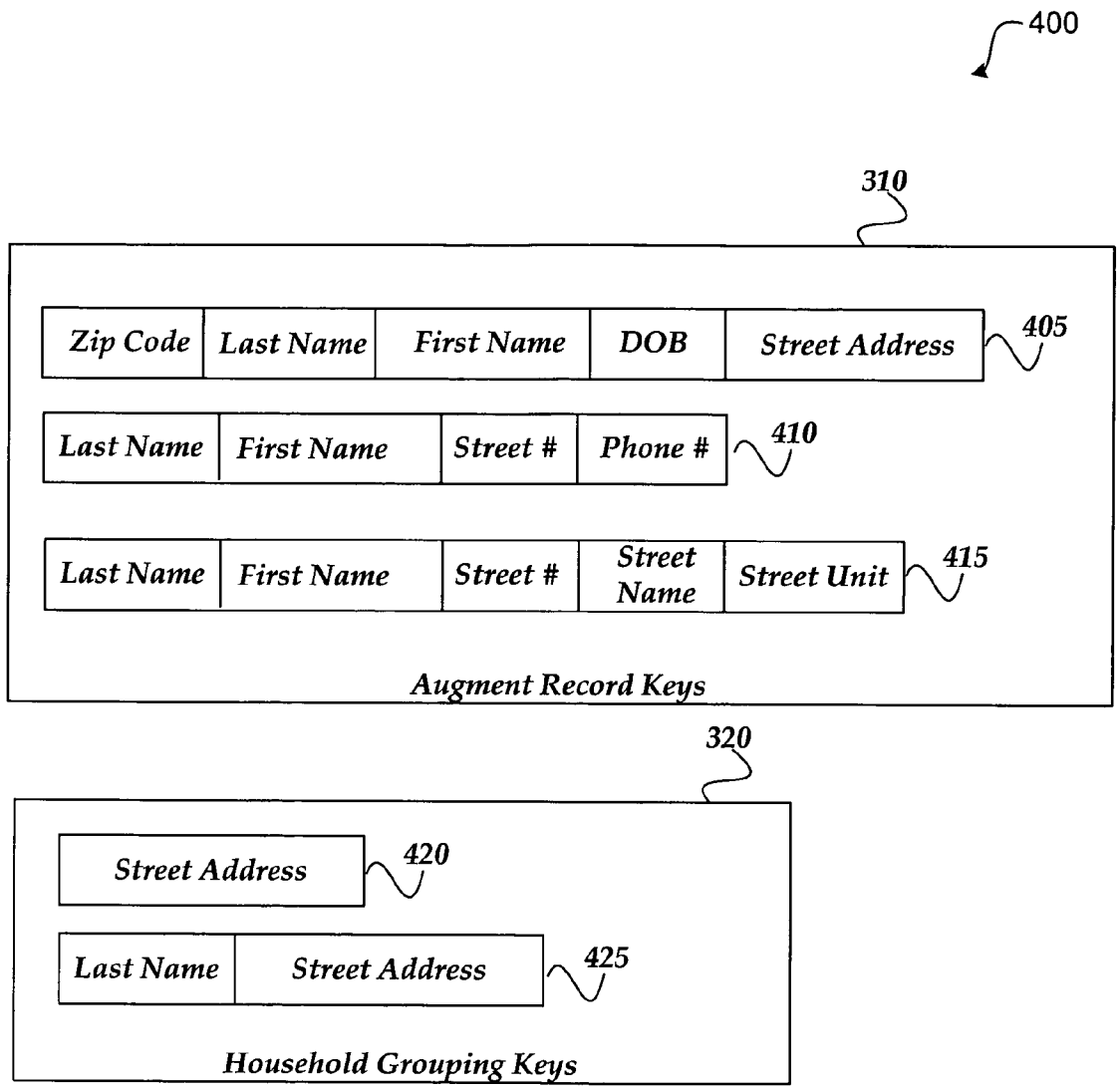
FIG. 4 shows exemplary keys.

FIG. 4 shows exemplary keys, in accordance with aspects of the invention. Keys 400 include augment record keys 310 and household grouping keys 320. Augment record keys 310 include Key 1 (405), Key 2 (410) and Key 3 (415). Household grouping keys 320 include Key 4 (420) and Key 5 (425).

Augment Record Key 1 (405) includes the following fields: zip code, last name, first name, date of birth, and full street address.

Augment Record Key 2 (410) includes the following fields: last name, first name, street number, and phone number.

Augment Record Key 3 (415) includes the following fields: last name, first name, street number, street name, and street unit. Street unit indicates an apartment number, suite number, a PO Box number, and the like.

Household Grouping Key 4 (420) includes a full street address field.

Household Grouping Key 5 (425) includes a last name field and a street address field.

While the fields within the keys are shown in a particular order, the order of the fields may be changed. Other fields within the keys may also be used. For example, a marriage field may be used within a key for household grouping.

Figure 5:
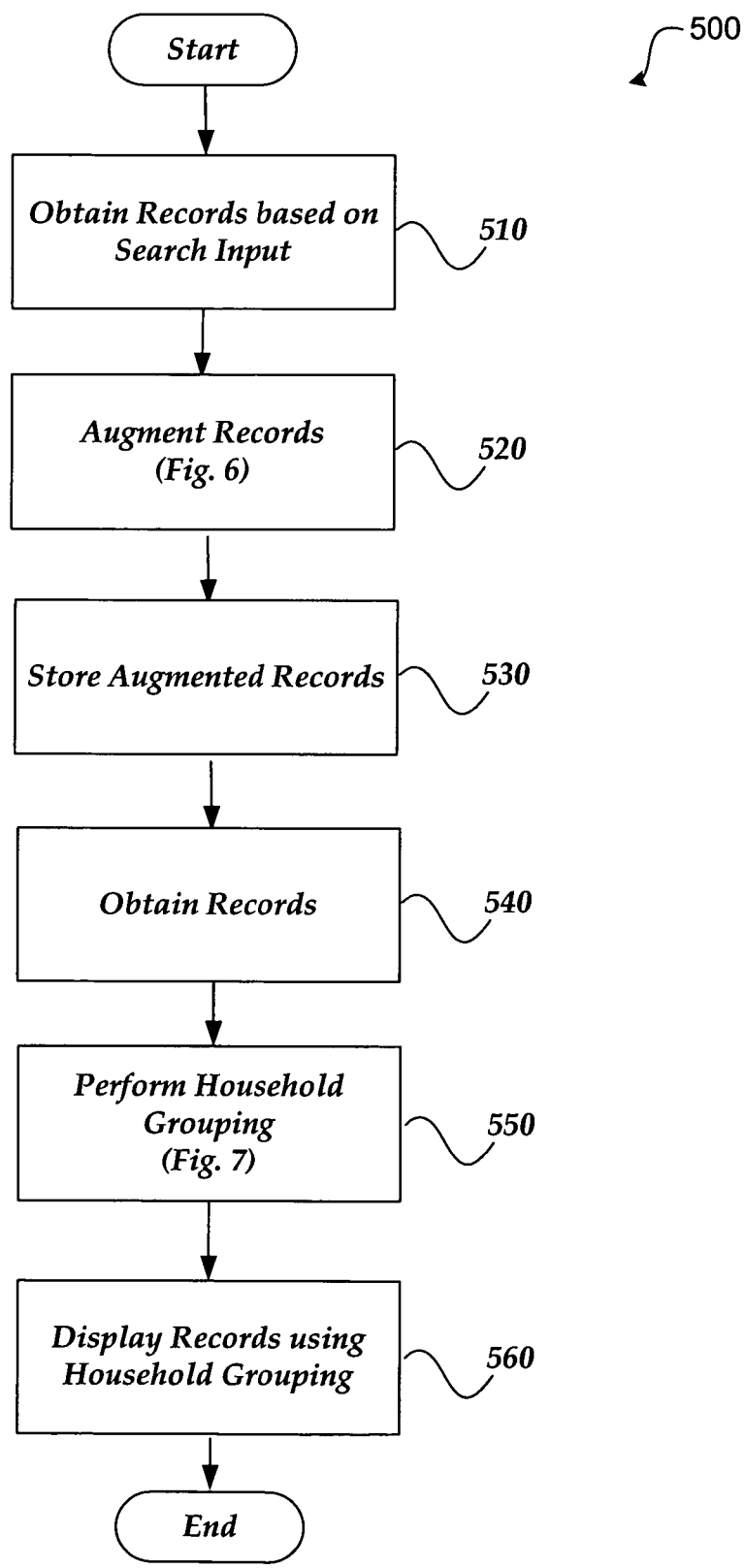
FIG. 5 shows an overview of a process for augmenting records and grouping households.

FIG. 5 shows an overview of a process for augmenting records and grouping households, in accordance with aspects of the invention.

After a start block, the process flows to block 510 where individual records are obtained from various public record sources based on search input. For example, a user may request to find an individual named "Joe Smith" located within a particular city. Based on the search input, records are obtained from the various sources. The sources may include, but are not limited too, a public records directory, a social security number directory, property records, a civil judgments database, marriage and divorce records, criminal records, a department of motor vehicles database, a professional licenses database, and the like.

Moving to block 520, the obtained records are augmented. Generally, augmenting the records includes combining the fields of the records identified to be the same individual into a single record and then removing the duplicate records (See FIG. 6 and related discussion).

Transitioning to block 530, the augmented records are stored in a data store for later access.

Flowing to block 540, records are obtained to perform the household grouping operation. The records may be obtained from the augmented record store as well as from any outside record source, such as the sources described above.

Moving to block 550, the household grouping operation is performed. Generally, household grouping involves augmenting the records when an outside record source is used, and then applying household grouping keys to the augmented records. The records having the same household grouping key value are grouped as a household.

Flowing to block 560, the household groupings are displayed (See FIG. 8). The process then moves to an end block.

Figure 6:
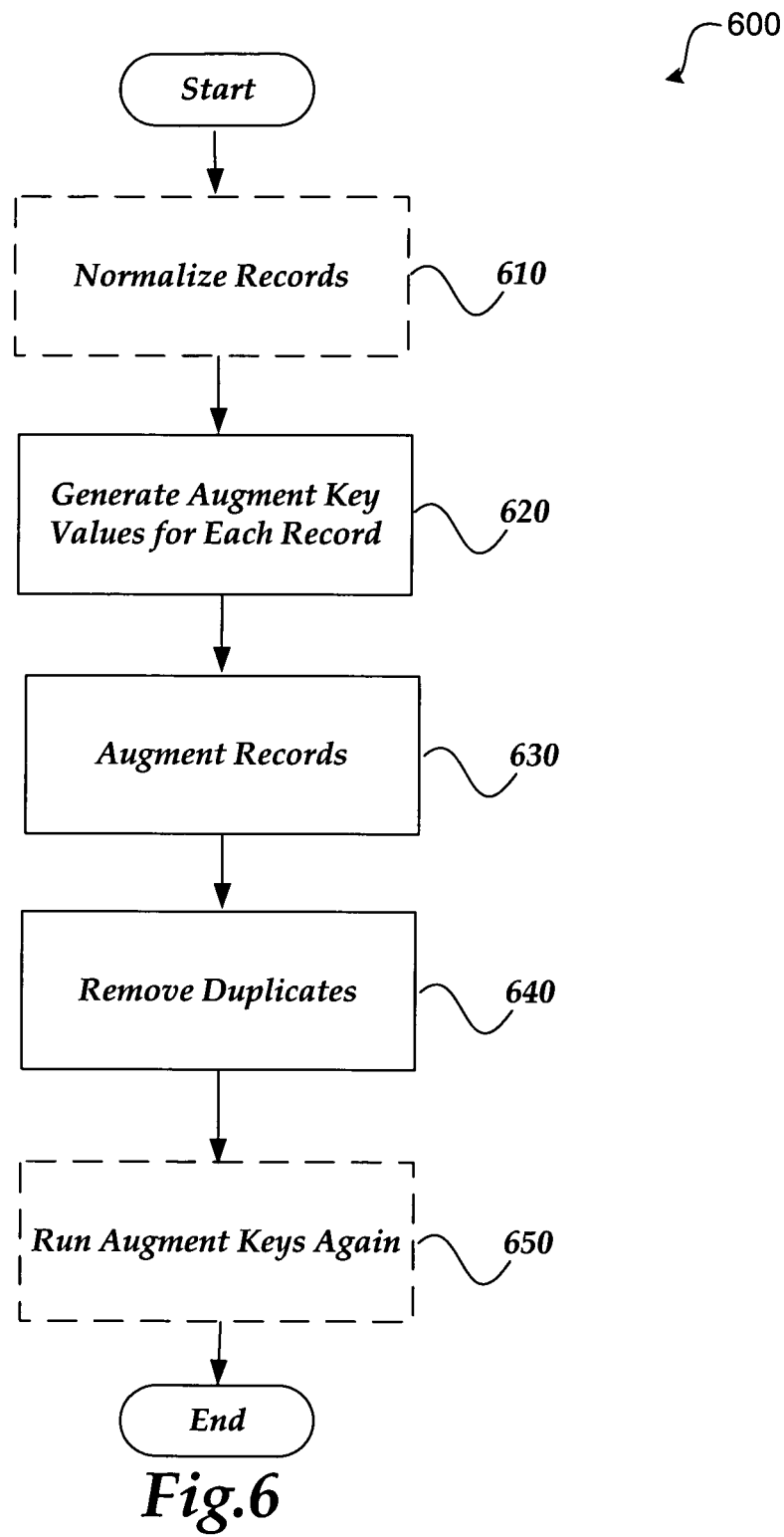
FIG. 6 shows a process for augmenting records.

FIG. 6 shows a process for augmenting records, in accordance with aspects of the present invention.

After a start block, the process flows to optional block 610. The obtained records may be normalized such that the keys are applied to records having the same format for the fields used within the key. For example, a telephone number will be normalized to ten digits, a street address will not include abbreviations, a date will be in the form "XX/XX/XXXX."

Moving to block 620, the augment keys are applied to each record creating an augment key value for each record. According to one embodiment, three augment keys are applied to each record (See FIGS. 3 and 4). According to one embodiment, the key values are hashed and referenced to the record.

Transitioning to block 630, the records having the same key values are augmented. According to one embodiment, the records having the same key value are OR'ed together creating a combined record. For example, one record may contain a phone number, last name and an address, while another record having the same key value may include a last name, first name, and address. In this instance, the augmented record will include the phone number, last name, first name, and an address. According to one embodiment, when the same fields conflict the most recent record field is used.

Flowing to block 640, the duplicate records are removed. Only one copy of a record having the same key value is maintained. Moving to optional block 650, the process may be run again to further refine the records. The process then moves to an end block.

Figure 7:
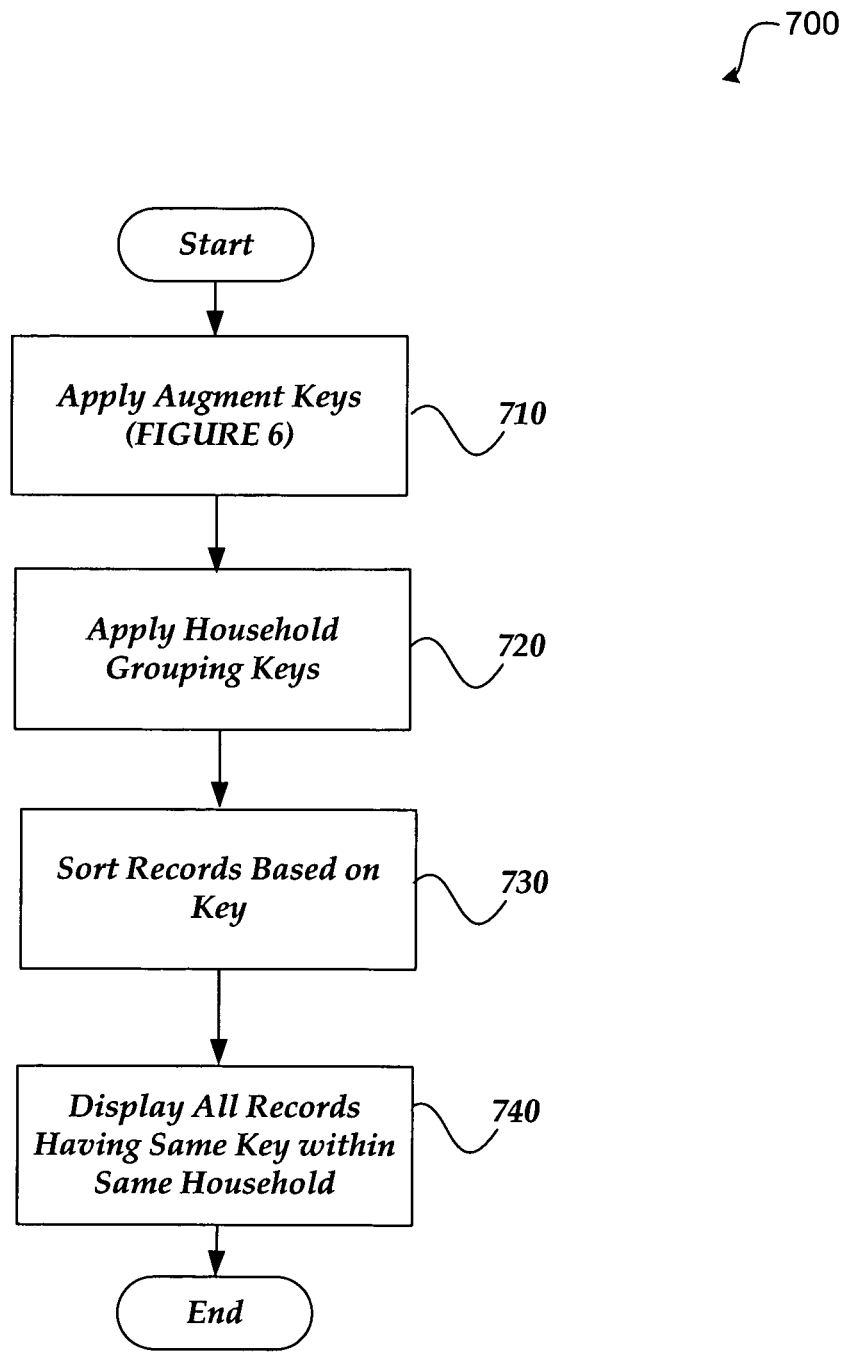
FIG. 7 illustrates a process for grouping household records.

FIG. 7 illustrates a process for grouping household records, in accordance with aspect of the invention.

After a start block, the process flows to block 710 where the augment keys are applied to the newly obtained records (See FIG. 6 and related discussion). According to one embodiment, the augment keys are only applied when records are obtained from records that have not already been augmented.

Moving to block 720, the household grouping keys are applied to the augmented keys creating a household grouping key value for each record.

Flowing to block 730, the records are sorted based on the household grouping key values. Moving to block 740, the records having the same key value are displayed as belonging to the same household.

FIG. 8 shows an exemplary household grouping screen, in accordance with aspects of the invention. Household grouping screen 800 includes search input interface 810 and results table 820.

According to the present example, a user is looking for individuals named "Joe Smith" residing in Small City, Wash. After entering the search information and selecting the search button, the results matching "Joe Smith" who reside in Small City, Wash. are listed along with his household members. Household grouping 1 includes five members. Household grouping 2 and 4 include one member and household grouping 3 includes two members.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method executing on a processor of a computing device for grouping household members associated with an individual, comprising:

obtaining records from a search of public records that are available to the public that is based on at least one value associated with the individual, wherein the at least one value is an identifier of the individual;

applying augment keys to the obtained records and receiving an augment key value for the obtained records, wherein an augment key comprises one or more fields from the obtained records;

augmenting the obtained records based on the augment key value, wherein augmenting the obtained records comprises, identifying one or more records associated with the individual in the obtained records, combining fields associated with the individual in the obtained records into a record being augmented and removing duplicate records;

storing the record being augmented without storing the obtained records; and performing household grouping on the stored augmented records, wherein the household grouping identifies household members within a household of the individual, wherein the household members are identified from the obtained records and wherein the obtained records include more than one household.

2. The method of claim 1, further comprising displaying the records according to the household grouping.

3. The method of claim 1, wherein obtaining the records further comprises obtaining at least a portion of the records from a public record source.

4. The method of claim 3, wherein augmenting the records further comprises removing duplicates from the obtained records.

5. The method of claim 3, wherein augmenting the records further comprises combining records when the records relate to the same individual.

6. The method of claim 3, wherein augmenting the records further comprises applying at least three-augment keys to each of the records to obtain the augment key value for each record.

7. The method of claim 6, further comprising sorting the key values to determine records that relate to the same individual.

8. The method of claim 2, wherein performing the household grouping further comprises applying at least one household grouping key to each of the records to obtain a household key value for each record and grouping the household based on the household key value.

9. A system for or grouping household members associated with an individual, comprising:
 at least one data store configured to store public records;
 a first computer, including:
  a first processor and a first computer-readable medium;
  a first operating environment stored on the first computer-readable medium and executing on the first processor;
  a first communication connection device operating under the control of the first operating environment and configured to connect to a network; and
  a first application operating under the control of the first operating environment and operative to perform actions, including:
   obtaining public records from the at least one data store based on at least one value associated with the individual; wherein the obtained records include more than one household;
   applying augment keys to each of the records and receiving an augment key value for each of the records, wherein an augment key comprises one or more fields from the obtained records;
   augmenting the records based on the augment key value; wherein augmenting the records comprises combining fields of each of the obtained records identified to be a same individual and removing duplicate records;
   storing the augmented records without storing the obtained records used to augment the records; and
   performing household grouping on the augmented records; wherein the household grouping identifies household members within a household of the individual; and
 a second computer, including:
  a second processor and a second computer-readable medium;
  a second operating environment stored on the second computer-readable medium and executing on the second processor;
  a display;
  a second communication connection device operating under the control of the operating environment and configured to connect to the network; and
  a second application operating under the control of the operating environment and operative to perform actions, including:
   receiving the household grouping; and
   displaying the household grouping on the display.

10. The system of claim 9, wherein augmenting the records further comprises removing duplicates from the obtained records.

11. The system of claim 10, wherein augmenting the records further comprises combining records.

12. The system of claim 11, wherein augmenting the records further comprises applying at least three-augment keys to each of the records to obtain the augment key value for each record.

13. The system of claim 12, further comprising: comparing each of the key values to determine records that are associated with an individual.

14. The system of claim 10, wherein performing the household grouping further comprises applying at least one household grouping key to each of the records to obtain a household key value for each record and grouping the household based on the household key value.

15. A computer-readable storage medium having computer instructions for grouping household members associated with an individual, the instructions executing on a processor of a computing device comprising:
 obtaining public records from a public data source based on at least one value associated with the individual; wherein the obtained records include more than one household;
 applying augment keys to each of the records and receiving an augment key value for each of the records, wherein an augment key comprises one or more fields from the obtained records;
 augmenting the records based on the augment key value; wherein augmenting the records comprises combining fields of each of the obtained records identified to be a same individual and removing duplicate records;
 storing the augmented records without storing the obtained records used to augment the records;
 performing household grouping on the augmented records; wherein the household grouping identifies household members within a household of the individual; and
 displaying the records according to the household grouping.

16. The computer-readable storage medium of claim 15, wherein augmenting the records further comprises removing duplicates from the obtained records.

17. The computer-readable storage medium of claim 16, wherein augmenting the records further comprises combining records.

18. The computer-readable storage medium of claim 17, wherein augmenting the records further comprises applying at least three-augment keys to each of the records to obtain the augment key value for each record.

19. The computer-readable storage medium of claim 18, further comprising: sorting the records based on their associated key values.

20. The computer-readable storage medium of claim 15, wherein performing the household grouping further comprises applying at least one household grouping key to each of the records to obtain a household key value for each record and grouping the household based on the household key value.

* * * * *